United States Patent
Harnois et al.

(10) Patent No.: US 8,266,530 B2
(45) Date of Patent: Sep. 11, 2012

(54) MULTIPLE DISPLAYS OF LARGE DYNAMIC ALARM WINDOWS

(75) Inventors: Pascal Harnois, Ottawa (CA); Susan Patricia Callow, Kanata (CA); David Kiesekamp, Merrickville (CA); Gerald Bloch, Ottawa (CA)

(73) Assignee: Alcatel Lucent, Paris (FR)

( * ) Notice: Subject to any disclaimer, the term of this patent is extended or adjusted under 35 U.S.C. 154(b) by 1012 days.

(21) Appl. No.: 11/730,588

(22) Filed: Apr. 3, 2007

(65) Prior Publication Data

US 2008/0250138 A1 Oct. 9, 2008

(51) Int. Cl.
*G06F 15/177* (2006.01)
*G06F 15/16* (2006.01)

(52) U.S. Cl. ........ 715/736; 715/733; 715/734; 715/738; 709/223

(58) Field of Classification Search .................. 715/763, 715/767, 733–739, 742, 744; 709/223
See application file for complete search history.

(56) References Cited

U.S. PATENT DOCUMENTS

| | | | |
|---|---|---|---|
| 6,239,699 B1* | 5/2001 | Ronnen | 340/517 |
| 6,456,306 B1* | 9/2002 | Chin et al. | 715/810 |
| 6,690,274 B1* | 2/2004 | Bristol | 340/506 |
| 6,853,388 B2* | 2/2005 | Ueno et al. | 715/736 |
| 6,901,442 B1* | 5/2005 | Schwaller et al. | 709/224 |
| 7,075,550 B2* | 7/2006 | Bonadio | 345/589 |
| 7,137,074 B1* | 11/2006 | Newton et al. | 715/835 |
| 7,143,153 B1* | 11/2006 | Black et al. | 709/223 |
| 7,185,075 B1* | 2/2007 | Mishra et al. | 709/223 |
| 7,480,917 B2* | 1/2009 | Richmond et al. | 719/313 |
| 7,711,811 B1* | 5/2010 | Adams | 709/224 |
| 2002/0012011 A1* | 1/2002 | Roytman et al. | 345/736 |
| 2002/0130904 A1* | 9/2002 | Becker et al. | 345/753 |
| 2004/0061716 A1* | 4/2004 | Cheung et al. | 345/710 |
| 2006/0085758 A1* | 4/2006 | Backus | 715/772 |
| 2006/0168083 A1* | 7/2006 | Lee et al. | 709/207 |
| 2006/0274703 A1* | 12/2006 | Connelly | 370/338 |
| 2008/0117068 A1* | 5/2008 | Sandstrom | 340/635 |

* cited by examiner

*Primary Examiner* — Nicholas Augustine
(74) *Attorney, Agent, or Firm* — Kramer & Amado, P.C.

(57) ABSTRACT

A GUI for a Network Management System client is provided. The GUI presents network alarms in more than one alarm window. Each alarm window includes a drop-down menu for selecting an alarm filter and a pause button for halting display of new alarms. Alarm filters may be retrieved from a database accessible from a number of NMS clients, thereby allowing public filters to be created by a supervisor. A method of automatically populating the "additional text" field of alarms in a way specified manually after installation of the NMS, which provides additional means of filtering alarms. The invention provides an improved interface by which network administrators can manage network alarms, the interface being particularly advantageous during floods of large numbers of network alarms.

20 Claims, 2 Drawing Sheets

MULTIPLE DISPLAYS OF LARGE DYNAMIC ALARM WINDOWS

FIELD OF THE INVENTION

This invention relates to network management systems, and more particularly to presentation of alarm information to network administrators.

BACKGROUND OF THE INVENTION

In a network management system (NMS) alarms may be triggered for a variety of reasons, such as failure of a link. An alarm is a notification of a specific event, such as a change of port status. An alarm may or may not represent an error. These alarms are presented to an operator performing network administration functions so that the operator may take action to correct the underlying cause of the alarm, if any such action is required.

These alarms contain standard parameters containing standardized information, and are typically presented to an operator as a line of text in a window. Multiple alarms are presented as multiple lines of text in the same window. While straightforward, this can result in alarms being presented to the operator as too much information too quickly, especially if a fault in the network results in generation of many simultaneous alarms. Alarms may scroll off the window before the operator has an opportunity to examine the information contained in the alarm text. The operator can filter the alarms somewhat by setting attributes in column headers, for example, but the filtering functions on typical NMSs are limited. Furthermore, switching between sets of filtered alarms requires editing an existing filter or retrieving a filter saved to the operator's client hard drive, at which point the single window refreshes with the new set of filtered alarms.

The standard parameters of alarms includes a field called "additional text". This field is typically used by an NMS server to enter non-configurable information regarding the alarm in the form of notes, notes which an operator may use when looking at an alarm again at a later time. This field provides a heretofore unrealized opportunity to store additional information automatically for use by operators.

A method of displaying alarms to operators in a way which allowed them to see all relevant information at a desired pace would allow the underlying causes of the alarms to be dealt with more efficiently.

SUMMARY OF THE INVENTION

According to one embodiment of the invention, a method of presenting network alarms through a graphical user interface (GUI) of a Network Management System (NMS) is provided. A plurality of alarms is received, and the alarms are presented in a plurality of alarm windows within the GUI. A first set of at least one alarm, satisfying a first alarm filter, may be presented in a first alarm window, and a second set of at least one alarm, satisfying a second alarm filter different from the first alarm filter, may be presented in a second alarm window. The method may be in the form of instructions on a computer-readable medium.

According to another embodiment of the invention, a method of populating an "additional text" field of an alarm is provided. At least one attribute is manually specified. The "additional text" field of the alarm is automatically populated with an attribute value for reach specified attribute.

By providing multiple windows for displaying alarms, a pause button to prevent scrolling of new alarms, a drop-down menu for selecting filters, and a database for storing public filters, the invention presents alarms to an operator in a manner which simplifies handling of multiple alarms. The automatic population of the "additional text" field of alarms according to user choice provides operators with more power and flexibility in setting filters and hence in managing alarms. The invention is particularly advantageous when a flood of alarms is presented to the operator, as the number of alarms presented in the GUI would be otherwise difficult to manage.

BRIEF DESCRIPTION OF THE DRAWINGS

The features and advantages of the invention will become more apparent from the following detailed description of the preferred embodiment(s) with reference to the attached diagrams wherein.

It will be noted that in the attached diagrams like features bear similar labels.

DETAILED DESCRIPTION OF THE EMBODIMENTS

Figure 1:
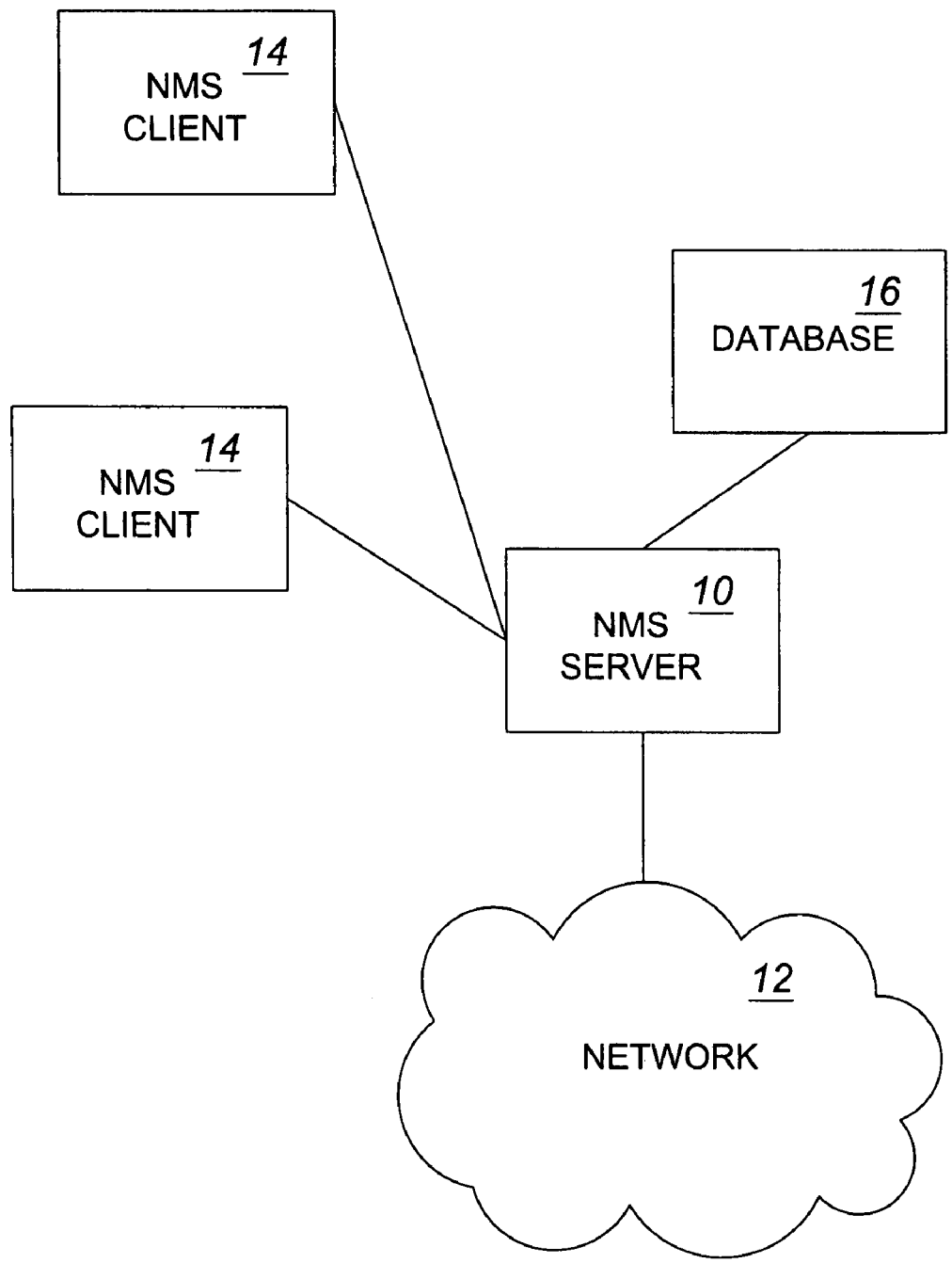
FIG. 1 is a diagram of a Network Management System components according to one embodiment of the invention.

Referring to FIG. 1, a system of network management system (NMS) components according to one embodiment of the invention is shown. An NMS server 10 monitors the status of components (not shown) within a network 12, such as network elements, ports, and links. The NMS server 10 may generate alarms in response to changes of status of components within the network 12, and passes such alarms on to at least one NMS client 14. While there may be only one NMS client 14, there will generally be a plurality of such clients. Some components within the network 12 may also generate events which are sent to the NMS server 10. The NMS server 10 may generate alarms as a result of these events, and these alarms are forwarded to the NMS clients 14. Each NMS client 14 stores alarms received from the NMS server 10 in an alarm cache of the NMS client 14. Each NMS client 14 also has access to a database 16 through the NMS server 10. The database 16 stores alarm filters for use by the NMS clients 14, as described below.

Figure 2:
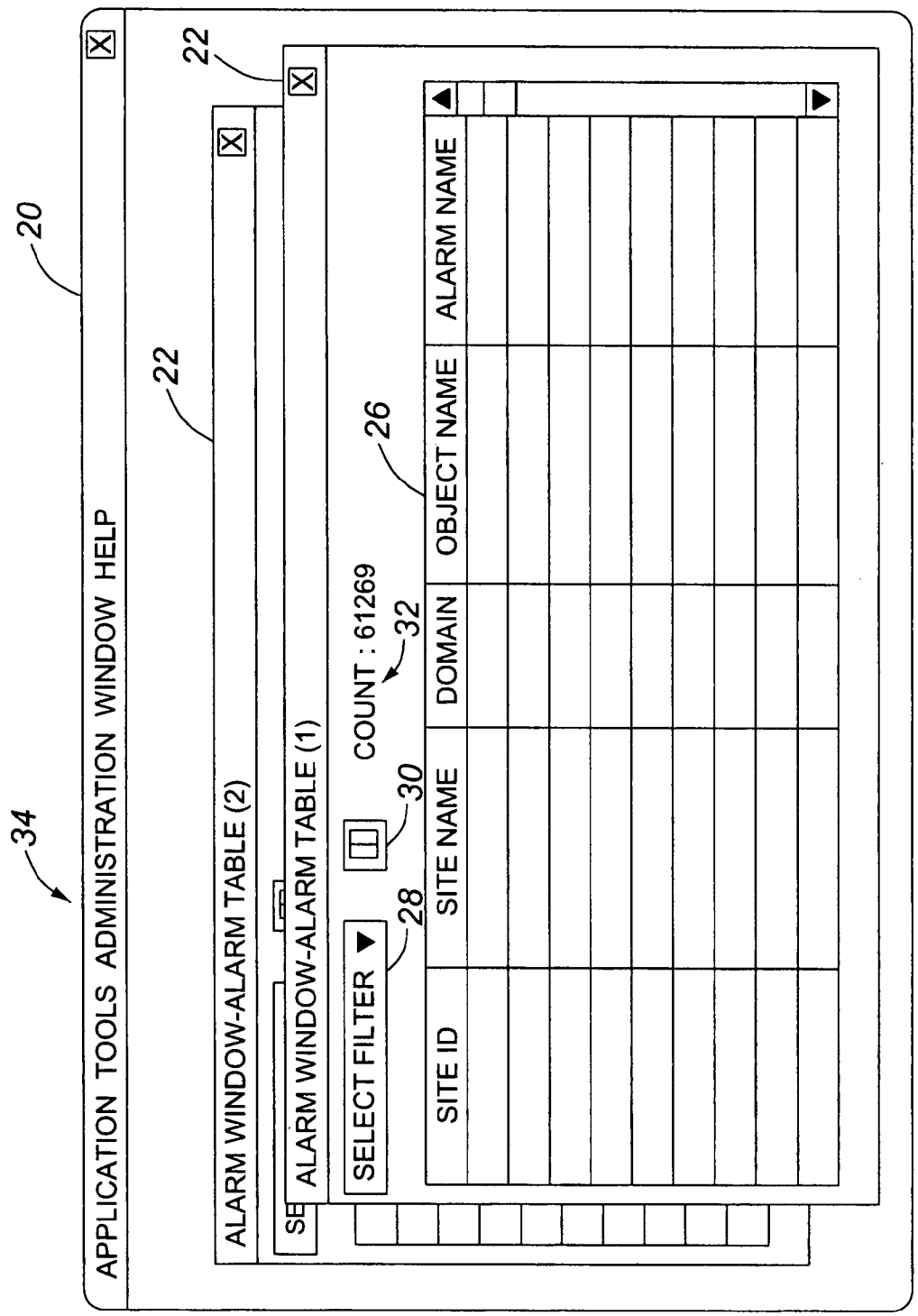
FIG. 2 is a diagram of components of a GUI screen of an NMS client of FIG. 1 according to one embodiment of the invention.

Referring to FIG. 2, a diagram of components of a graphic user interface (GUI) of an NMS client 14 of FIG. 1 is shown according to one embodiment of the invention. The GUI provides an interface through which an operator at an NMS client 14 can monitor and interact with alarms. The GUI includes a main application window 20. Within the main application window 20, a plurality of alarm windows 22 may be present. Each alarm window displays an alarm list 26, each alarm list 26 listing at set of at least one alarm and presenting standard information for each alarm, such as probable cause, perceived severity, and additional text.

The number of alarm windows 22 that are present within the application window 20 will depend on choices made by the operator. The operator may create new alarm windows using the controls of the application window 20. The use of multiple alarm windows 22 allows the operator more choice in how alarms are presented, giving him or her more flexibility in dealing with the alarms. Each alarm window lists alarms which satisfy the alarm filter selected for that alarm window. For example, a first alarm window may be filtered to present alarms for a specified network element, and a second alarm window may be filtered to present alarms for a second network element. This allows the operator to easily switch between sets of alarms.

Each alarm window 22 contains a drop-down filter menu 28 by which an operator may easily choose amongst stored alarm filters. These alarm filters are stored in the database 16. Storing the alarm filters in the database 16 allows global alarm filters to be created and used by all operators, even if the operators are located at different NMS clients 14. For example, a network administrator acting as a supervisor may create global filters for use by all operators within his or her department. The network administrator may create such global filters at one NMS client 14, and then the different operators access the global filter through different NMS clients 14. The use of the database 16 to store alarm filters also allows individual operators to store private filters in the database 16, and then later access these private filters from a different NMS client 14. Although shown as in FIG. 1 as separate entities, the database 16 may be located on the NMS server 10.

Each alarm window 22 also includes a pause button 30. When the pause button 30 is selected, addition of new alarms to the alarm window is halted and deletion of exiting alarms from the alarm window is halted. This allows operators to temporarily halt the display of additional alarms, which is useful in preventing alarms from scrolling off the displayed alarm list 26 during a flood of alarms. When the pause button 30 is selected again (i.e. unpaused) then the alarm list 26 is updated with any alarm additions or removals that were received while the alarm list 26 was paused.

Each alarm window 22 also includes a count 32 of the current number of alarms within the alarm list 26.

As stated above, each alarm includes as part of its standard information an "additional text" field. Through the application window 20, such as by means of an "administration" menu item 34, an operator can set additional text policies. The additional text policies are set manually, after installation of the NMS. These specify what information from the alarmed network component is to be placed in the "additional text" field of the alarms. The operator specifies one or more attributes whose attribute values are to populated by the NMS server 10. Population of the "additional text" field of the alarms with the attribute value of each specified attribute is carried out by an "additional text" field populator on the NMS server 10. For example, an operator may generate an additional text policy for all port alarms, specifying the attribute of "Client". Thereafter, all newly generated alarms for ports will have their "additional text" field populated by the NSM server 10 with the text "Client=" followed by the client name. This allows filters (either global or private) to be created for use in presenting only port alarms for specified clients, by filtering out network alarms whose "additional text" field does not match specified attribute values.

The "additional text" field populator is preferably in the form of software instructions loaded into a processor, but may also be in the form of hardware logic, or a combination of both. If in the form of software instructions, the software instructions may be stored on computer-readable media.

The methods of presenting alarm information on a GUI, described above, are preferably carried out by a processor reading software instructions. Alternatively, the instructions for carrying out the methods may be in the form of hardware logic, or a combination of hardware logic and software instructions. If in the form of software instructions, the software instructions may be stored on computer-readable medium.

The method of presenting alarm information on a GUI has been described collectively, namely presenting alarms in multiple alarm windows, providing each alarm window with a pause button, providing each alarm window with a drop-down filter menu, storing filters an a database accessible by all NMS clients, and providing means for automated population of the "additional text" field of alarms. Each of these features may be provided independently of the other features, or in various combinations, and still provide advantages to the interface through which an operator manages alarms for a network.

The invention has been described as presenting alarm information through a GUI located on NMS clients 14. Alternatively, there may be no NMS clients 14 and the GUI located on the NMS server 10. While the advantage of storing filters on the database is lessened in such an embodiment, the advantages of the remaining features remain.

The embodiments presented are exemplary only and persons skilled in the art would appreciate that variations to the above described embodiments may be made without departing from the spirit of the invention. The scope of the invention is solely defined by the appended claims.

We claim:

1. A method of presenting network alarms through a graphical user interface (GUI) of a Network Management System (NMS), comprising:
   receiving, in the NMS, first and second sets of alarms, wherein each set of alarms comprises probable cause and perceived severity;
   presenting the first set of alarms in a first alarm window within the GUI, wherein the first set of alarms satisfies a first alarm filter;
   presenting the second set of alarms in a second alarm window within the GUI, wherein the second set of alarms satisfies a second alarm filter that is different from the first alarm filter; and
   storing the first alarm filter and the second alarm filter in a database accessible by a first NMS client on which the GUI is located, wherein the database is also accessible by at least a second NMS client on which a separate implementation of the GUI is located.

2. The method of claim 1, further comprising:
   presenting a drop-down filter menu in each alarm window, whereby an alarm filter for the corresponding alarm window may be selected by an operator.

3. The method of claim 1, further comprising:
   presenting a pause button in each alarm window, whereby addition of new alarms to the alarm window is halted when the pause button of the alarm window is selected.

4. The method of claim 1, further comprising:
   generating at least one of the first alarm filter and the second alarm filter through the second NMS client.

5. The method of claim 4, wherein the at least one alarm filter generated through the second NMS client is generated by an operator different from the operator operating the first NMS client.

6. The method of claim 1, further comprising:
   setting an "additional text" policy which specifies at least one attribute; and
   populating an "additional text" field of alarms with an attribute value for each attribute specified in the "additional text" policy.

7. The method of claim 6, wherein setting an "additional text" field policy further comprises:
   setting the "additional text" field policy manually after installation of the NMS.

8. The method of claim 7, wherein populating an "additional text" field further comprises:
populating the "additional text" field by an NMS server.

9. The method of claim 6, wherein at least one alarm filter filters out alarms whose "additional text" field does not match a specified attribute value.

10. A computer-readable medium containing instructions which can be processed by a computer processor, the instructions comprising:
instructions for receiving first and second sets of alarms generated as a result of events in a telecommunications network, wherein each set of alarms comprises probable cause and perceived severity;
instructions for presenting the first set of alarms in a first alarm window within a graphical user interface (GUI) of a Network Management System (NMS), wherein the first set of alarms satisfies a first alarm filter;
instructions for presenting the second set of alarms in a second alarm window within a graphical user interface (GUI) of a Network Management System (NMS), wherein the second set of alarms satisfies a second alarm filter that is different from the first alarm filter; and
storing the first alarm filter and the second alarm filter in a database accessible by a first NMS client on which the GUI is located, wherein the database is also accessible by at least a second NMS client on which a separate implementation of the GUI is located.

11. The computer-readable medium of claim 10, further comprising:
instructions for presenting a drop-down filter menu in each alarm window, whereby an alarm filter for the corresponding alarm window may be selected by an operator.

12. The computer-readable medium of claim 10, further comprising:
instructions for retrieving the first alarm filter and the second alarm filter from a database located on a different computing platform than the one on which the GUI is presented.

13. The method of claim 1, wherein each alarm window presents sets of alarms for different network elements.

14. The method of claim 1, wherein the alarm filters may be either global alarm filters or private alarm filters.

15. The method of claim 1, wherein the database is located on a NMS server.

16. The method of claim 3, further comprising:
halting deletion of exiting alarms from the alarm window is halted when the pause button of the alarm window is selected.

17. The method of claim 3, further comprising:
after reselecting the pause button of the alarm window, updating with any alarm additions or removals received during selection of the pause button.

18. The method of claim 1, further comprising:
displaying a count of a current number of alarms within each alarm window.

19. The method of claim 1, further comprising:
generating the first and second sets of alarms in a NMS server.

20. The method of claim 1, wherein private alarm filters created on a first NMS client are subsequently accessible on a different NMS client.

* * * * *